United States Patent [19]
Vukorpa et al.

[11] Patent Number: 5,637,938
[45] Date of Patent: Jun. 10, 1997

[54] TUNED DYNAMIC VIBRATION ABSORBER

[75] Inventors: Victor M. Vukorpa, St. Joseph, Mich.; Douglas C. Debrecht, St. Charles, Mo.; Larry B. Wells, St. Louis, Mo.; L. Ranney Dohogne, Creve Coeur, Mo.; Barry M. Newberg, Florissant, Mo.

[73] Assignee: Whirlpool Corporation, Benton Harbor, Mich.

[21] Appl. No.: 291,167

[22] Filed: Aug. 16, 1994

[51] Int. Cl.⁶ .................................................. H02K 33/00
[52] U.S. Cl. ........................................................... 310/51
[58] Field of Search ........................... 310/51; 248/559; 188/378–380; 318/649

[56] References Cited

U.S. PATENT DOCUMENTS

| | | | |
|---|---|---|---|
| 1,834,860 | 12/1931 | Morrill | 310/51 X |
| 1,855,570 | 4/1932 | Edison | 310/51 X |
| 2,237,916 | 4/1941 | Schwarz et al. | 310/51 |
| 2,484,241 | 10/1949 | Mulheim | 310/51 X |
| 2,953,697 | 9/1960 | Wall | 310/51 |
| 3,270,221 | 8/1966 | Shaffer | 310/51 |
| 3,337,165 | 8/1967 | Kondo | 248/15 |
| 3,566,993 | 3/1971 | Leatherwood | 188/1 B |
| 3,668,571 | 6/1972 | Sato | 333/79 |
| 4,661,731 | 4/1987 | Wenz | 310/51 |
| 4,852,848 | 8/1989 | Kucera | 248/559 |
| 4,959,568 | 9/1990 | Stokes | 310/51 |

FOREIGN PATENT DOCUMENTS

| | | |
|---|---|---|
| 0204330 | 12/1986 | European Pat. Off. . |
| 0552695 | 7/1993 | European Pat. Off. . |
| 864178 | 1/1953 | Germany . |
| 1148108 | 5/1963 | Germany . |
| 434355 | 8/1935 | United Kingdom . |
| 2086007 | 5/1982 | United Kingdom . |

OTHER PUBLICATIONS

Abstract of Japanese 59–9334 of Jan. 18, 1984.
Abstract of Japanese 55–119248 of Sep. 12, 1980.

*Primary Examiner*—Mark O. Budd
*Attorney, Agent, or Firm*—Hill, Steadman & Simpson

[57] ABSTRACT

A vibration absorber is provided for reducing noise and vibration emanating from an electric motor, or another vibrating object, and the surrounding structure to which it is mounted. The vibration absorber has a beam with a mass secured thereto. The vibration absorber is mounted externally to the motor, in a direction perpendicular to an axis of torsional vibration of the motor. The absorber is tuned to have a resonant frequency corresponding to the torsional vibrational frequency of the motor.

17 Claims, 2 Drawing Sheets

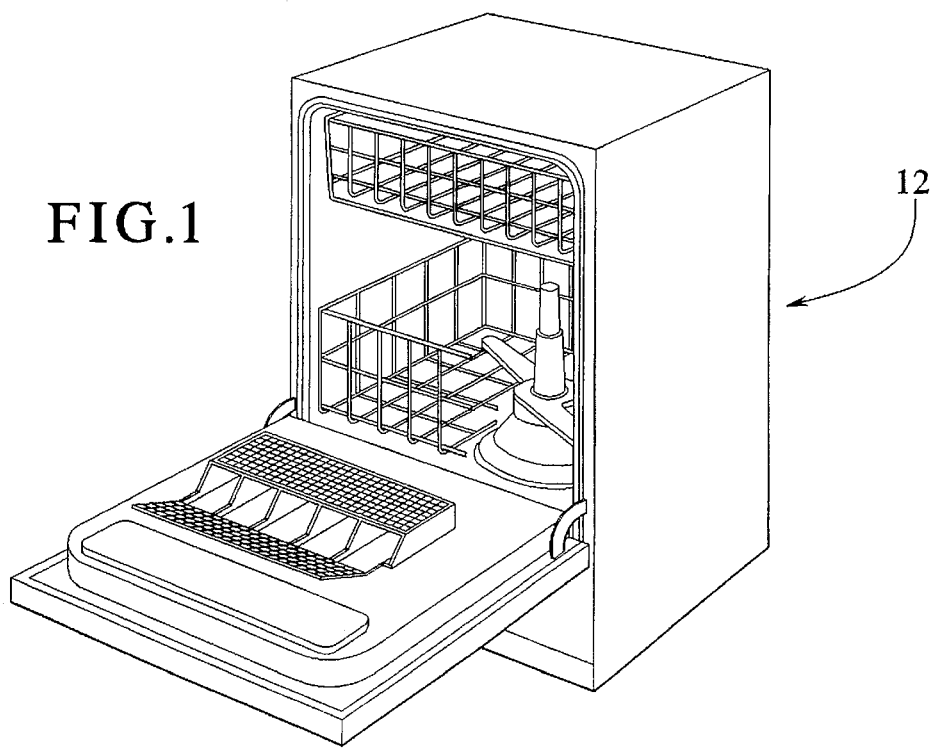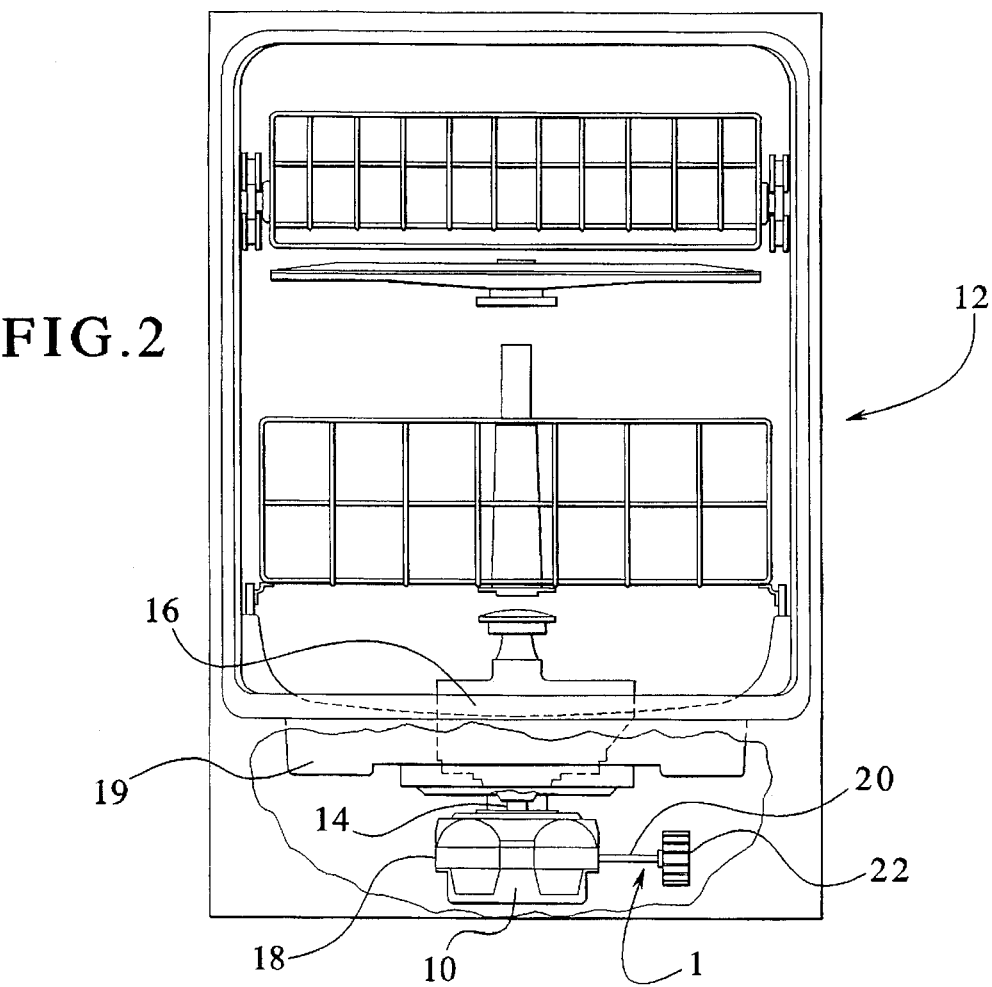

TUNED DYNAMIC VIBRATION ABSORBER

BACKGROUND OF THE INVENTION

The present invention generally relates to vibration absorbers. More specifically, this invention relates to a vibration absorber having a characteristic resonant frequency tuned to absorb vibrational input energy having a known frequency.

Many appliances utilize electric motors. For example, a dishwasher has an electric motor which can be used for driving a pump impeller. Also, clothes washing machines and dryers use electric motors.

Objects such as motors have a vibrational output due to the cyclic forces acting therein. An electric motor can vibrate in three directions during operation: axial, radial and rotational, or torsional. Usually, the most significant vibration is torsional.

Torsional vibration of an electric motor is caused by torque pulsations inherent to the operation of AC electric motors. In the United States, AC line voltage has a phase that cycles at 60 Hz. In most other countries, AC line voltage has a phase that cycles at 50 Hz. The torque pulsations within an electric motor are caused by a changing electrical field acting within the motor which occurs at 120 Hz—twice the cycling frequency of the 60 Hz AC power supply (100 Hz for 50 Hz power supply). The changing field causes equal and opposite reaction forces between a rotor and stator of the motor. This causes the rotor to rotate, performing work.

Motor vibration is transmitted through the motor housing to the structure to which the motor can be attached. The transmitted vibration causes structure borne noise. Such noise is undesirable, particularly where the motor is a component of a domestic appliance or in another application intended for a quiet environment. Therefore, it is desirable to reduce the transmission of electric motor vibration to reduce noise.

Known technology for preventing the transmission of motor vibration to a surrounding structure includes resilient isolation mounting, active vibration control systems, reduction of the electromagnetic forces through motor-designed modifications, axis-symmetric internally mounted spring-mass vibration absorbers, and multiple externally mounted axis-parallel spring-mass vibration absorbers.

For instance, U.S. Pat. No. 1,855,570 teaches the use of multiple tuned vibration absorbers mounted to an electric motor housing to reduce vibration. Each vibration absorber comprises a rod and a mass, wherein each rod and mass combination has a natural frequency substantially the same as the vibration which it is intended to reduce. The vibration absorbers are aligned parallel to the axis of rotation.

Also, U.S. Pat. No. 1,834,860 discloses a vibration absorber for an electric motor which has an annular weight mounted internally to the motor housing by multiple springs. The weight and springs are designed to have a natural frequency in the rotational direction corresponding to the rotational vibration of the motor. The weight is aligned on the axis of rotation.

Active vibration cancellation systems are complex and expensive. Other methods, such as with known spring-mass systems, can be less expensive. However, such systems can be inadequate for sufficiently reducing transmitted motor vibration.

A need, however, exists for a simple, inexpensive vibration absorber for effectively reducing vibration of an electric motor and reducing noise transmission to surrounding structures.

SUMMARY OF THE INVENTION

The present invention provides a simple, yet effective solution to reducing noise and vibration emanating from an electric motor, or another vibrating object, and the surrounding structure to which it is mounted. To this end, the present invention provides a vibration absorber which has a beam and a mass secured thereto. The absorber is preferably tuned to have a resonant frequency near the torsional vibrational frequency of the motor. The vibration absorber is mounted externally to the motor, in a direction perpendicular to the axis of the motor.

In an embodiment, the vibrational frequency of the motor is 120 Hz, while in another embodiment the vibrational frequency of the motor is 100 Hz.

In an embodiment, the beam is a rod having a circular cross-section.

In an embodiment, the beam is threaded to the motor.

In an embodiment, the absorber has an inertia about an axis of torsional vibration of the motor so that effects of side resonances of the absorber are minimized.

The vibration absorber greatly reduces rotational vibration of the motor housing. Therefore, noise emanating from the motor housing and from the structure to which the housing is mounted is also greatly reduced.

An advantage of the present invention is that it provides a vibration absorber that effectively reduces transmitted noise from a vibrating object.

Another advantage of the present invention is that it provides a vibration absorber that is simple in design.

A further advantage of the present invention is that it provides a vibration absorber that is simple to install.

Additional features and advantages of the present invention are described in and will be apparent from the detailed description of the presently preferred embodiments and from the drawings.

BRIEF DESCRIPTION OF THE DRAWINGS

FIG. 1 illustrates a perspective view of a dishwasher embodying the features of the present invention.

FIG. 2 is a front plan view of a dishwasher embodying the features of the present invention, having a portion broken away to show the positioning of a motor and absorber of the present invention.

DETAILED DESCRIPTION OF THE PREFERRED EMBODIMENTS

Figure 3:
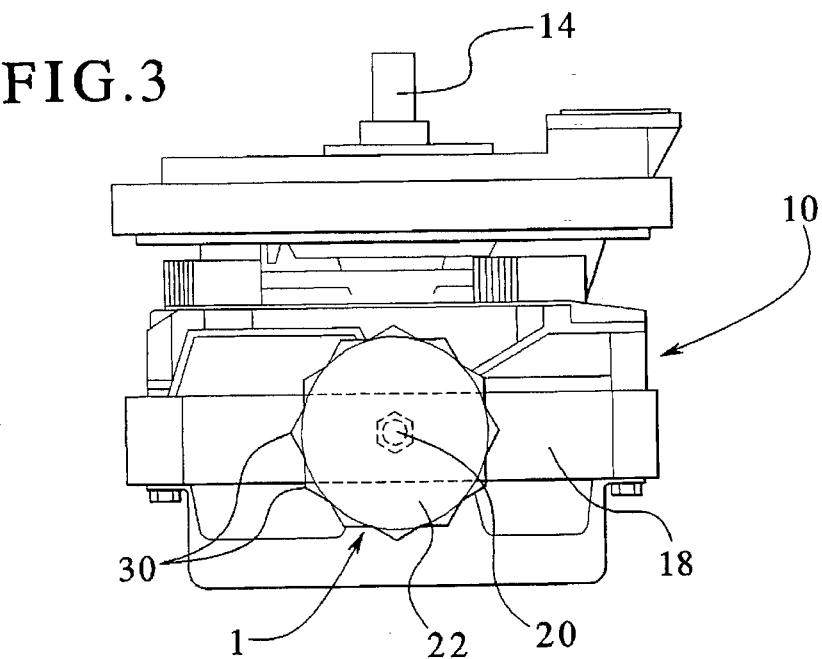
FIG. 3 is a side plan view of a motor and absorber system of the present invention.

In accordance with the invention described with reference to the accompanying figures wherein like numerals designate like parts, a tuned dynamic vibration absorber 1 is provided to absorb vibration from a vibrating mass. The vibrating mass can be, for example, an electric motor 10.

The invention is particularly suited for use with a dishwasher 12, as illustrated in FIG. 1. The dishwasher 12 has an electric motor 10 as illustrated in FIG. 2. As shown, the motor 10 is mounted in the bottom of the dishwasher 12 so that a rotor shaft 14 of the motor 10 is aligned on a vertical axis. The rotor shaft 14 is connected to a pump 16. Also, the motor has a housing 18.

Vibration of the motor 10 during operation can be transmitted through the mounting connection to the structure of the dishwasher 12. This results in structure borne noise emanating from the dishwasher 12. The present invention provides an absorber 1 which reduces motor 10 vibration and related noise. The absorber 1, described in detail below, is preferably dimensioned so that the motor 10, the pump 16, and the absorber 1, when assembled together, can be positioned in the a tub 19 in the bottom of the dishwasher 12.

It should be understood that the present invention is not limited to use with a dishwasher 12. The absorber 1 could be used to reduce motor vibration in many applications.

Figure 4:
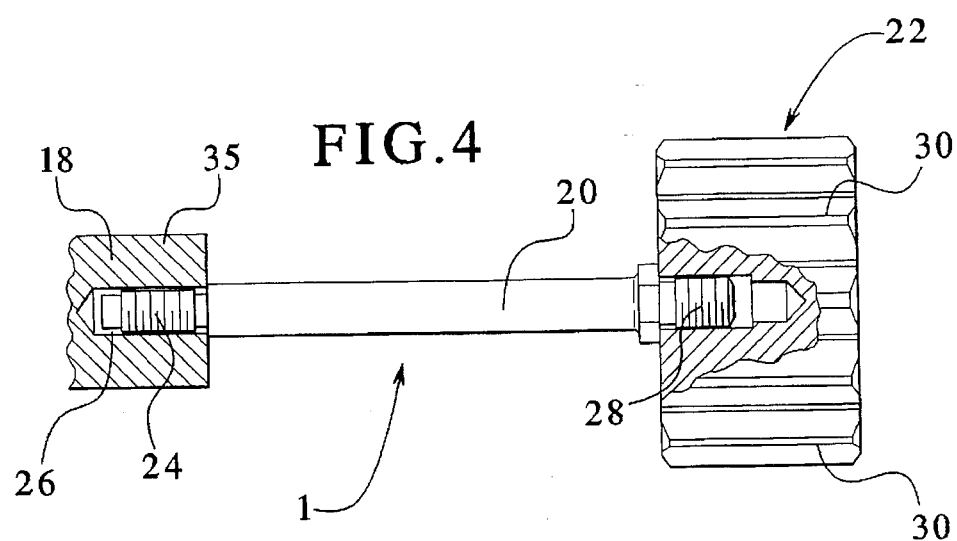
FIG. 4 is a fragmentary front view of an absorber of the present invention having portions broken away to show threaded connections of the beam.

Referring to FIGS. 2, 3, and 4, a single absorber 1 is provided which includes a beam 20 and a mass 22. The beam 20 and mass 22 are configured to be externally mounted to the motor 10 so that the beam 20 is perpendicular to the rotational axis of the motor 10.

The beam 20 is an elongated member which can be a variety of shapes. However, the beam 20 is preferably straight and has a circular or rectangular cross-section for ease of design. The beam 20 of the embodiment illustrated has a circular cross-section.

As illustrated in FIG. 4, The beam 20 is secured to the motor housing 18. Preferably, the beam 20 has a first threaded portion 24 which can be threaded into a threaded hole 26 in the motor housing 18. In an embodiment, the beam 20 can be secured threaded into a corner cleat (not shown) which is used to clamp a plurality of stator laminations together. In such an embodiment, the threaded portion 24 would extend into a hole drilled parallel to the laminations.

A nut portion 35 of the beam 20 is preferably provided for engagement by a wrench. An assembler can thereby turn the first threaded portion 24 into the hole 26. The hole 26 is oriented so that the beam 20 is securable perpendicularly to the rotational axis of the motor 20.

As also illustrated in FIG. 4, The mass 22 is secured to the beam 20 at an end opposite the connection to the motor 10. The mass 22 is preferably generally cylindrical in shape. Preferably, the mass 22 is threaded to a second threaded portion 28 of the beam 20. However, in an embodiment, the mass 22 and beam 20 can be a single component. Furthermore, the mass 22 preferably has ridges 30 forming a twelve-point configuration which can be engaged by a standard socket wrench.

Figure 5:
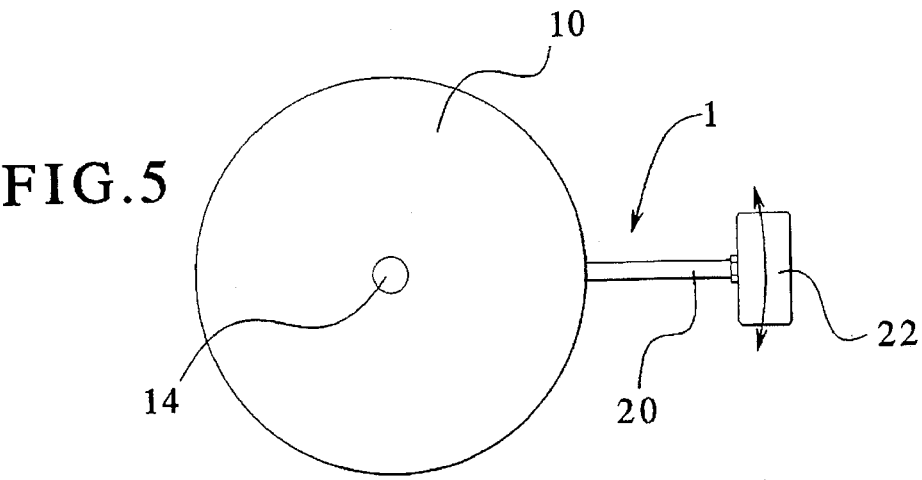
FIG. 5 is a top plan view of a motor and absorber of the present invention.

The invention takes advantage of the dynamic relationship between two mass-spring-damper systems: a primary system (the motor 10) and a secondary system (the absorber 1). The parameters of the secondary system preferably are designed so that the natural frequency of the secondary system is "tuned", or matched, to the operating vibrational forcing frequency of the primary system so that the absorber operates about its maximum vibration absorption point. The result is a deflection absorber 1 of the secondary system at its natural frequency producing a force equal to but out of phase (approximately 180 degrees at resonance) with the excitation force, the vibration of the motor 10 although there may be other reaction components in operational use. This reduces the force output at that frequency of the combined primary and secondary systems. FIG. 5 illustrates the motion of the deflection of the absorber 1.

In the present invention, the primary system is the motor 10 which preferably operates on 60 Hz alternating current and has a rotational, or torsional, vibration at 120 Hz. It should be recognized, however, that the tuned absorber 1 can be designed for use with other vibrating objects or for operation at other frequencies. For instance, it could be designed for use with a motor 10 that operates on 50 Hz alternating current and which has a 100 Hz vibration.

The absorber 1 is mounted externally to the motor 10 perpendicular to the axis of the motor 10, around which the torsional vibration motion is centered. Only one such absorber 1 is attached to the motor 10 in the present invention. The vibration absorber 1 is preferably designed to provide an optimal initial absorbing force while minimizing sensitivity to system variability. As a result, the absorber 1 significantly reduces torsional vibration of the motor 10 and structure borne noise.

The tuned absorber's dimensions are designed so that the absorber's first natural frequency, a bending mode in a plane of the torsional vibration, is tuned to reduce the 120 Hz motor torsional vibration excitation force of the motor 10 (for a 60 Hz system). The absorber 1 is mounted externally to increase its inertial effects. This optimizes the inertia ratio of the primary and secondary systems for preventing higher and lower frequency system resonances from interfering with proper operation of the tuned absorber 1. Since the inertia force is optimized, only one externally mounted absorber 1 is necessary.

Preferably, the absorber 1 reduces the transmissibility of the combined absorber and motor system. Two degrees of freedom can be presumed: the rotation of the motor 10 and the deflected motion of the absorber 1. The natural frequencies and transmissibility for a two degree of freedom translational system (neglecting damping) are defined as:

$$w1 = \sqrt{\frac{k1}{m1}} \quad w2 = \sqrt{\frac{k2}{m2}}$$

$$Trans_1 = \frac{\left[1 - \left[\frac{wi}{w2}\right]^2\right]}{\left[\left[1 + \frac{k2}{k1} - \left[\frac{wi}{w1}\right]^2\right]\left[1 - \left[\frac{wi}{w2}\right]^2\right] - \frac{k2}{k1}\right]}$$

The transmissibility is the ratio of the primary system's force output to the forcing function force output. The equation for transmissibility shows that as the forcing frequency approaches W2, the secondary system's natural frequency, the transmissibility goes to zero. In other words, the vibration output of the composite system per unit vibration input is reduced.

The tuned dynamic vibration absorber 1 can be modeled as a mass suspended from a cantilevered beam. The beam 20 stiffness, mass, dimensions, area moment of inertia and cantilevered mass 22 are selected at specific values to tune the system's first bending mode (lowest natural frequency) to the frequency of vibration to be reduced.

The moment of inertia for a beam 20 having a circular cross-section can be calculated from the following formula where the beam's radius is represented by the term h:

$$I_i = \frac{[h_i]^4 \pi}{4}$$

Alternatively, where the cross-section of the beam 20 is rectangular, the moment of inertia can be calculated from the following formula where h and b represent the beam's thickness and width respectively:

$$I_i = \frac{b_i[h_i]^3}{12}$$

In order to optimize the performance of the single externally mounted tuned absorber 1, the material, dimensions, geometry and mass of the absorber 1 are selected in order to tune the first bending mode resonance of the system to a forcing function frequency, in this case, 120 Hz from torsional vibration of the motor 10, or alternatively 100 Hz. The calculation for the first bending mode of a cantilevered beam 20 having a length L and a Circular cross-section is:

$$f_{i,j} = \frac{1}{(2\pi)} \cdot \sqrt{3 \cdot E_k \cdot \frac{I_i}{[L_j]^3} \cdot \frac{1}{[M_m + 0.24 \cdot mb_n]}}$$

Particular attention must be given to the beam radius, h, and length, L, dimensions since they are higher order terms representing non-linear sensitivities of the system.

The tuned absorber 1 mass and geometry are designed to have an inertia around the axis which minimizes the effects of frequency tuning errors and the effects of corresponding side resonances. Also, the material of the beam 20 preferably resists fatigue stress for the deflection of the beam 20. The result is a robust single tuned absorber 1 designed with optimal vibration absorption.

An important design parameter is the ratio of the motor 10 inertia to the absorber 1 inertia. This ratio determines the frequency span between the resonant frequencies immediately above and below the preferred design frequency, 120 Hz. The ratio is designed for a frequency span which minimizes amplification of the system's vibration due to the side resonances. Such a frequency span is dependent on the system's design and tolerances, damping factors affecting the side resonances and the tolerable performance deviation in the particular application.

The inertia of the absorber 1 is optimized by mounting it externally to the vibrating system. External mounting positions the absorber mass 22 farther from the center of gravity of the vibrating primary system, the motor 10, increasing the inertia of the absorber 1. The calculation for the inertia of a cylindrical mass 22 and beam about the motor center of gravity, where the center of gravity is assumed to be on the axis of rotation, is as follows:

$$I_{external} = I_{mass} + mL_{mass}^2 + I_{beam} + mL_{beam}^2$$

The parallel axis theorem adds the term $mL^2$ to each of the inertia calculations for the mass and rod. The $L^2$ term is critical for optimizing the inertia of the system. As the length of the mass center of gravity from the motor center of gravity is increased, the inertia of the mass 22 increases by the square of the distance. Therefore, small increases in this distance can result in large increases of the tuned absorber inertia. This also makes the system sensitive to the weight of the tuned absorber mass 22 since it is the constant that L is multiplied by.

Using the foregoing formulae, values for the beam 20 mass and dimensions and the quantity of the mass 22 can be selected for given materials to provide an absorber 1 having the desired resonant frequency and inertia characteristics. It has been found that mass 20 having a weight of 0.5 pounds is adequate to provide a desirable sensitivity range. Furthermore, it has been found that a inertia ratio of the secondary mass to the primary mass for the system is 1:13.

The first threaded portion 24 is preferably tightened into the hole 26 to a predetermined torque value associated with a required joint stiffness so that the absorber 1 and motor 10 vibrate as one rigid component. An assembler can use a wrench to turn the nut portion of the beam 20 into the hole 26 to the predetermined torque value.

It should be understood that various changes and modifications to the presently preferred embodiment described herein will be apparent to those skilled in the art. Such changes and modifications may be made without departing from the spirit and scope of the present invention and without diminishing its attendant advantages. It is, therefore, intended that such changes and modifications be covered by the appended claims.

The embodiments of the invention in which an exclusive property or privilege is claimed are therefore defined as follows:

1. A device comprising:
   a motor having a housing and a central axis; and
   a vibration absorber reducing torsional vibration of said housing around said axis at a vibrational frequency, the vibration absorber including:
   a beam having a first end and a second end, said first end being secured to said motor housing perpendicularly to said axis; and
   a mass secured to said second end;
   wherein said vibration absorber has an inertia about said axis for which side resonances of the absorber result in minimal amplification of resonance at said vibrational frequency.

2. A device according to claim 1 wherein said beam has a circular cross-section.

3. A device according to claim 1 wherein said vibrational frequency is 120 Hz.

4. A device according to claim 1 wherein said vibrational frequency is 100 Hz.

5. A device according to claim 1 wherein said beam is threaded to said housing.

6. A device according to claim 1 wherein said device has a resonant frequency equal to said vibrational frequency and said device resonates out of phase with said housing to counteract vibration of said housing.

7. A low-vibration motor comprising:
   a motor housing;
   rotational shaft aligned on a central axis; and
   a single vibration absorber consisting of:
   a single beam having a first end secured to said motor housing generally perpendicularly to said central axis; and
   a mass secured to a second end of said beam;
   wherein said absorber has a resonant frequency corresponding to a vibrational frequency of torsional vibrational motion of said motor housing and said absorber resonates out of phase with said motor housing to counteract said torsional vibrational motion.

8. A low-vibration motor according to claim 7 wherein said vibrational frequency is about 120 Hz.

9. A low-vibration motor according to claim 7 wherein said vibrational frequency is about 100 Hz.

10. A low-vibration motor according to claim 7 wherein said vibration absorber has an inertia about said axis for which side resonances of the absorber result in minimal amplification of resonance at said resonant frequency.

11. A low-vibration motor according to claim 7 wherein said beam has a circular cross-section.

12. An appliance comprising:
    a motor having a central axis; and an absorber for reducing torsional vibration of said motor around said axis at a vibrational frequency, the absorber consisting of:
 a beam secured to said motor and aligned perpendicularly to said axis; and
 a mass secured to said beam;
 wherein said absorber has a natural frequency about equal to said vibrational frequency and said absorber resonates out of phase with said motor to counteract vibrational motion of said motor.

13. An appliance according to claim 12 wherein said absorber has an inertia about said axis for which side resonances of the absorber result in minimal amplification of resonance at said natural frequency.

14. An appliance according to claim 12 wherein said absorber has a first natural resonant frequency of about 120 Hz.

15. An appliance according to claim 12 wherein said absorber has a first natural resonant frequency of about 100 Hz.

16. An appliance according to claim 12 wherein said beam is rod-shaped.

17. An appliance according to claim 12 wherein said beam is threaded to said motor.

\* \* \* \* \*